(12) United States Patent
Tu et al.

(10) Patent No.: US 12,380,142 B2
(45) Date of Patent: Aug. 5, 2025

(54) SEQUENCED DATA PROCESSING METHOD AND DEVICE, AND TEXT PROCESSING METHOD AND DEVICE (71) Applicants: BEIJING WODONG TIANJUN INFORMATION TECHNOLOGY CO., LTD., Beijing (CN); BEIJING JINGDONG CENTURY TRADING CO., LTD., Beijing (CN)

(72) Inventors: Ming Tu, Beijing (CN); Jing Huang, Beijing (CN); Xiaodong He, Beijing (CN); Bowen Zhou, Beijing (CN)

(73) Assignees: BEIJING WODONG TIANJUN INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 314 days.

(21) Appl. No.: 17/995,140

(22) PCT Filed: Mar. 2, 2021

(86) PCT No.: PCT/CN2021/078719
§ 371 (c)(1),
(2) Date: Sep. 30, 2022

(87) PCT Pub. No.: WO2021/196954
PCT Pub. Date: Oct. 7, 2021

(65) Prior Publication Data
US 2023/0244704 A1 Aug. 3, 2023

(30) Foreign Application Priority Data
Mar. 30, 2020 (CN) .......................... 202010237454.6

(51) Int. Cl.
*G06F 16/3329* (2025.01)
*G06F 40/284* (2020.01)
*G06F 40/295* (2020.01)

(52) U.S. Cl.
CPC ........ *G06F 16/3329* (2019.01); *G06F 40/284* (2020.01); *G06F 40/295* (2020.01)

(58) Field of Classification Search
CPC .. G06F 16/3329; G06F 40/284; G06F 40/295; G06F 16/906; G06F 16/9024;
(Continued)

(56) References Cited

U.S. PATENT DOCUMENTS

2019/0139622 A1 5/2019 Osthege

FOREIGN PATENT DOCUMENTS

| CN | 104598440 A | 5/2015 |
| CN | 109978060 A | 7/2019 |

(Continued)

OTHER PUBLICATIONS

Shi, M., Tang, Y., Zhu, X., and Liu, J., "Feature-Attention Graph Convolutional Networks for Noise Resilient Learning", 2019. doi: 10.48550/arXiv.1912.11755. https://arxiv.org/abs/1912.11755 (Year: 2019).*

(Continued)

*Primary Examiner* — Bhavesh M Mehta
*Assistant Examiner* — Jangwoen Lee
(74) *Attorney, Agent, or Firm* — Myers Bigel, P.A.

(57) ABSTRACT

A method includes constructing a graph including a plurality of nodes for a set of sequences, wherein each node corresponds to a sequence in the set of sequences; for each node, determining an initial feature matrix of the node, wherein the initial feature matrix of the node includes initial vectors of various elements in a sequence corresponding to the node; and, inputting the initial feature matrix of the node of the (Continued)

graph into a graph sequence network to enable the graph sequence network to update the feature matrix of the node using the feature matrix(es) of adjacent node(s) of the node; and obtaining a feature matrix output by the graph sequence network of each node to perform a sequence-based classification prediction using output feature matrixes, wherein the feature matrix output for each node includes updated vectors corresponding to the various elements in the sequence corresponding to the node.

18 Claims, 5 Drawing Sheets

(58) Field of Classification Search
CPC ........ G06F 16/35; G06N 3/0442; G06N 7/01; G06N 3/042; G06N 3/0455; G06N 3/09; G06N 3/045
USPC ............................................................ 704/9
See application file for complete search history.

(56) References Cited

FOREIGN PATENT DOCUMENTS

| CN | 110119467 A | 8/2019 |
|----|-------------|--------|
| CN | 110188422 A | 8/2019 |
| CN | 110490717 A | 11/2019 |
| CN | 110674301 A | 1/2020 |
| CN | 110705260 A | 1/2020 |
| CN | 111461301 A | 7/2020 |

OTHER PUBLICATIONS

Seo, M., 2016. Bidirectional attention flow for machine comprehension. arXiv preprint arXiv:1611.01603. (Year: 2016)*
1st Chinese Office Action corresponding to CN 202010237454.6; dated Oct. 26, 2020 (10 pages).
2nd Chinese Office Action corresponding to CN 202010237454.6; dated Jan. 19, 2021 (6 pages).
International Search Report corresponding to PCT/CN2021/078719; dated May 21, 2021 (4 pages).
Extended European Search Report corresponding to European Patent Application No. 21779395.9 (7 pages) (dated Apr. 8, 2024).
Deac, et al., "Empowering graph representation learning with paired training and graph co-attention", https://openreview.net (14 pages) (2019).
Ruiz, et al., "Gated Graph Convolutional Recurrent Neural Networks", 27th European Signal Processing Conference (EUSIPCO) (5 pages) (2019).
Xu, et al., "Inductive Representation Learning on Temporal Graphs", arXiv.org, Cornell University Library, 201 Olin Library Cornell University Ithaca, NY 14853 (19 pages) (2020).

* cited by examiner

SEQUENCED DATA PROCESSING METHOD AND DEVICE, AND TEXT PROCESSING METHOD AND DEVICE

CROSS-REFERENCE TO RELATED APPLICATIONS

The present disclosure is a U.S. National Stage Application under 35 U.S.C. § 371 of International Patent Application No. PCT/CN2021/078719, filed on Mar. 2, 2021, which is based on and claims priority of Chinese application for invention No. 202010237454.6, filed on Mar. 30, 2020, the disclosure of both of which are hereby incorporated into this disclosure by reference in their entirety.

TECHNICAL FIELD

The disclosure relates to the field of data processing, and particularly to a sequenced data processing method and device, and text processing method and device.

BACKGROUND

Graph neural networks (GNN) models based on correlations between nodes in a graph, and is a kind of neural network that acts directly on the graph. Each node in the graph is represented by a vector. GNN has been widely used in many fields, such as natural language processing, knowledge graph system, recommendation system, life science and so on.

SUMMARY

According to a first aspect of some embodiments of the present disclosure, there is provided a sequenced data processing method, comprising: constructing a graph comprising a plurality of nodes for a set of sequences, wherein each node corresponds to a sequence in the set of sequences; for each node: determining an initial feature matrix of the node, wherein the initial feature matrix of the node comprises initial vectors of various elements in a sequence corresponding to the node; and, inputting the initial feature matrix of the node of the graph into a graph sequence network to enable the graph sequence network to update the feature matrix of the node using the feature matrix(es) of adjacent node(s) of the node; and obtaining a feature matrix output by the graph sequence network of each node to perform a sequence-based classification prediction using output feature matrixes, wherein the feature matrix output for each node comprises updated vectors corresponding to the various elements in the sequence corresponding to the node.

In some embodiments, for each node in the graph, a feature matrix of the node output by each layer of the graph sequence network is determined according to a feature matrix of the node output by a previous layer and the feature matrix(es) of adjacent node(s) of the node output by the previous layer.

In some embodiments, the updating the feature matrix of the node comprises: for Kth layer of the graph sequence network, determining a cooperative attention coding result between a feature matrix of the node of the graph and feature matrix(es) of adjacent node(s) of the node, wherein K is a positive integer; and pooling the cooperative attention coding results corresponding to all adjacent node(s) of the node to obtain a feature matrix of the node output by (K+1)th layer of the graph sequence network.

In some embodiments, for Kth layer of the graph sequence network, the determining a cooperative attention coding result between a feature matrix of the node of the graph and feature matrix(es) of adjacent node(s) of the node comprises: for each node of the graph, according to a feature matrix of the node and feature matrix(es) of adjacent node(s) of the node output by Kth layer of the graph sequence network, calculating correlations between elements in a sequence corresponding to the node and elements in a sequence corresponding to the adjacent node(s) to obtain a correlation matrix; obtaining a first matrix and a second matrix by transforming the feature matrix of the node and the feature matrix(es) of the adjacent node(s) of the node output by the Kth layer using the correlation matrix respectively; and calculating correlations among the feature matrix of the node output by the Kth layer, the first matrix and the second matrix as the cooperative attention coding result between the feature matrix of the node and the feature matrix(es) of the adjacent node(s).

In some embodiments, the sequenced data processing method further comprises: determining input features for prediction according to the feature matrixes of one or more nodes of the graph output by the graph sequence network; and inputting the input features for prediction into a machine learning model to obtain a classification result.

In some embodiments, the inputting the input features for prediction into a machine learning model to obtain a classification result comprises: inputting the input features for prediction into the machine learning model to obtain a classification result of each element in a sequence involved in one or more nodes to perform sequence tagging according to the classification result of each element.

In some embodiments, the inputting the input features for prediction into a machine learning model to obtain a classification result comprises: inputting the input features for prediction into the machine learning model to obtain a classification result of a sequence involved in one or more nodes, or a classification result of an object composed of the sequence involved in one or more nodes.

In some embodiments, the sequenced data processing method further comprises: inputting the sequence into an encoder to obtain initial vectors of various elements in the sequence output by the encoder.

In some embodiments, the sequence is text.

In some embodiments, the elements in the sequence are tokens in the text, wherein the tokens comprise at least one of words, roots, or affixes.

In some embodiments, the sequence comprises one or more of sentences, phrases, named entities, or noun phrases; and a plurality of nodes that meet at least one of the following conditions are adjacent nodes: a plurality of nodes corresponding to multiple sentences from a same document, a plurality of nodes corresponding to multiple sentences with a same named entity or noun phrase, and a plurality of nodes corresponding to multiple sentences with named entities or noun phrases appearing in preacquired question text.

According to a second aspect of some embodiments of the present disclosure, a text processing method is provided, comprising: constructing a graph comprising a plurality of nodes for a set of text, wherein each node corresponds to a piece of text in the set of text; for each piece of text, using a matrix generated by converting the text as an initial feature matrix of a corresponding node, wherein the feature matrix comprising initial vectors of various elements in the text corresponding to the node; for each node, inputting the initial feature matrix of the node of the graph into a graph sequence network to obtain a feature matrix output by the graph sequence network for each node as an updated feature matrix of the text corresponding to the node, wherein the feature matrix of each node is updated using the graph sequence network, and the feature matrix output for each node comprises updated vectors corresponding to various elements in the text corresponding to the node; performing a text classification prediction using the output feature matrixes.

In some embodiments, for each node in the graph, a feature matrix of the node output by each layer of the graph sequence network is determined according to a feature matrix of the node output by a previous layer and the feature matrix(es) of adjacent node(s) of the node output by the previous layer.

In some embodiments, the updating the feature matrix of the node comprises: for Kth layer of the graph sequence network, determining a cooperative attention coding result between a feature matrix of the node of the graph and feature matrix(es) of adjacent node(s) of the node, wherein K is a positive integer; and pooling the cooperative attention coding results corresponding to all adjacent node(s) of the node to obtain a feature matrix of the node output by (K+1)th layer of the graph sequence network.

In some embodiments, for Kth layer of the graph sequence network, the determining a cooperative attention coding result between a feature matrix of the node of the graph and feature matrix(es) of adjacent node(s) of the node comprises: for each node of the graph, according to a feature matrix of the node and feature matrix(es) of adjacent node(s) of the node output by Kth layer of the graph sequence network, calculating correlations between elements in a sequence corresponding to the node and elements in a sequence corresponding to the adjacent node(s) to obtain a correlation matrix; obtaining a first matrix and a second matrix by transforming the feature matrix of the node and the feature matrix(es) of the adjacent node(s) of the node output by the Kth layer using the correlation matrix respectively; and calculating correlations among the feature matrix of the node output by the Kth layer, the first matrix and the second matrix as the cooperative attention coding result between the feature matrix of the node and the feature matrix(es) of the adjacent node(s).

In some embodiments, the text processing method further comprises: determining input features for prediction according to the feature matrixes of one or more nodes of the graph output by the graph sequence network; and inputting the input features for prediction into a machine learning model to obtain a classification result of the text.

In some embodiments, the inputting the input features for prediction into a machine learning model to obtain a classification result of the text comprises: inputting the input features for prediction into the machine learning model to obtain a classification result of each element in the text involved in one or more nodes to perform sequence tagging for the text according to the classification result of each element.

In some embodiments, the inputting the input features for prediction into a machine learning model to obtain a classification result of the text comprises: inputting the input features for prediction into the machine learning model to obtain a classification result of the text involved in one or more nodes, or a classification result of an object composed of the text involved in one or more nodes.

In some embodiments, the text processing method further comprises: inputting the text into an encoder to obtain initial vectors of various elements in the text output by the encoder.

In some embodiments, the elements in the text are tokens in the text, wherein the tokens comprise at least one of words, roots, or affixes.

In some embodiments, the text comprises one or more of sentences, phrases, named entities, or noun phrases; and a plurality of nodes that meet at least one of the following conditions are adjacent nodes: a plurality of nodes corresponding to multiple sentences from a same document, a plurality of nodes corresponding to multiple sentences with a same named entity or noun phrase, and a plurality of nodes corresponding to multiple sentences with named entities or noun phrases appearing in preacquired question text.

According to a third aspect of some embodiments of the present disclosure, there is provided a sequenced data processing apparatus, comprising: a memory; a processor coupled to the memory, the processor configured to, based on instructions stored in the memory, carry out any one of the foregoing sequenced data processing methods.

According to a fourth aspect of some embodiments of the present disclosure, there is provided a text processing apparatus, comprising: a memory; a processor coupled to the memory, the processor configured to, based on instructions stored in the memory, carry out any one of the foregoing text processing methods.

According to a fifth aspect of some embodiments of the present disclosure, there is provided a non-transitory computer-readable storage medium on which a computer program is stored, wherein the program when executed by a processor carries out any of the foregoing sequenced data processing methods or text processing methods.

Some embodiments of the present disclosure have the following advantages or beneficial effects. With the embodiments of the present disclosure, when performing graph-based processing on sequence data, correlations between different sequences can be mined while preserving sequence characteristics of the data. Therefore, the amount of information lost in the construction of a graph-based neural network when processing sequence data can be reduced, and the accuracy of classification prediction based on the processed data can be improved.

Other features and advantages of the present invention will become apparent from the following detailed description of exemplary embodiments of the present disclosure with reference to the accompanying drawings.

BRIEF DESCRIPTION OF THE DRAWINGS

In order to more clearly explain the embodiments of the present invention or the technical solutions in the prior art, a brief introduction will be given below for the drawings required to be used in the description of the embodiments or the prior art. It is obvious that, the drawings illustrated as follows are merely some of the embodiments of the present disclosure. For a person skilled in the art, he or she may also acquire other drawings according to such drawings on the premise that no inventive effort is involved.

DETAILED DESCRIPTION

Below, a clear and complete description will be given for the technical solution of embodiments of the present disclosure with reference to the figures of the embodiments. Obviously, merely some embodiments of the present disclosure, rather than all embodiments thereof, are given herein. The following description of at least one exemplary embodiment is in fact merely illustrative and is in no way intended as a limitation to the invention, its application or use. All other embodiments obtained by persons of ordinary skill in the art based on the embodiments of the present disclosure without creative efforts shall fall within the protection scope of the present disclosure.

Unless otherwise specified, the relative arrangement, numerical expressions and numerical values of the components and steps set forth in these examples do not limit the scope of the invention.

At the same time, it should be understood that, for ease of description, the dimensions of the various parts shown in the drawings are not drawn to actual proportions.

Techniques, methods, and apparatus known to those of ordinary skill in the relevant art may not be discussed in detail, but where appropriate, these techniques, methods, and apparatuses should be considered as part of the specification.

Of all the examples shown and discussed herein, any specific value should be construed as merely illustrative and not as a limitation. Thus, other examples of exemplary embodiments may have different values.

Notice that, similar reference numerals and letters are denoted by the like in the accompanying drawings, and therefore, once an article is defined in a drawing, there is no need for further discussion in the accompanying drawings.

After analyzing GNN, the inventor found that GNN only supports nodes represented in the form of vectors. In related technologies, GNN will summarize all vectors included in a sequence into a vector of preset dimensions when initializing each node if an input object is a sequence. For example, a vector is obtained through calculation such as pooling, which is used as an initial vector of the node to carry out subsequent calculation. Thus, the object after GNN processing loses the characteristics of the sequence and cannot accurately reflect the inherent characteristics of the input object, resulting in a reduction in the accuracy of a subsequent prediction based on a GNN output result.

One technical problem to be solved by the embodiments of the present disclosure is: how to reduce the amount of information lost in the construction of a graph-based neural network when processing sequence data, so as to improve the accuracy of classification prediction based on the processed data.

Figure 1:
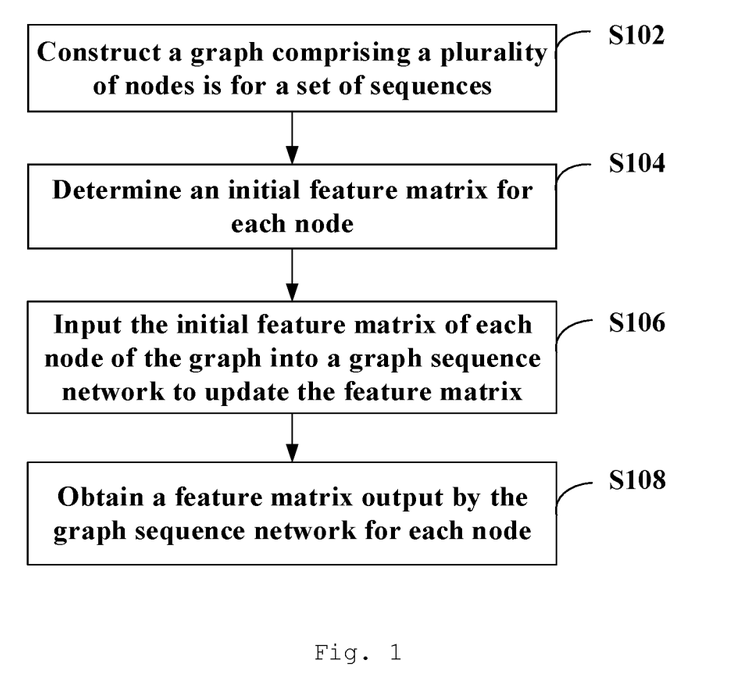
FIG. 1 shows a flowchart of a sequenced data processing method according to some embodiments of the present disclosure.

FIG. 1 shows a flowchart of a sequenced data processing method according to some embodiments of the present disclosure. As shown in FIG. 1, the sequenced data processing method of this embodiment comprises steps S102 to S108.

In step S102, a graph comprising a plurality of nodes is constructed for a set of sequences, wherein each node corresponds to a sequence in the set of sequences.

In some embodiments, a sequence corresponding to a node is a piece of text, and elements in the sequence are tokens in the text, wherein the tokens comprise at least one of words, roots, or affixes. For example, a graph can be constructed for one or more articles, each node in the graph corresponds to a sentence, a phrase, a named entity, and so on. For Chinese, for example, each Chinese character in a sentence can be treated as an element in a sequence; for English, for example, a word can be treated as an element in a sequence, or a root or affix obtained by word splitting can be treated as an element in a sequence.

In addition to text, a graph can also be constructed based on other types of sequences. In some embodiments, a sequence comprises data of the same object at multiple time points. For example, it comprises a user's network access data at multiple time points, a user's medical data at multiple time points, user access data of accessing objects on the Internet at multiple time points, and so on.

For each node, steps S104 to S106 are processed.

In step S104, an initial feature matrix is determined for the node, wherein the initial feature matrix of the node comprises initial vectors of various elements in a sequence corresponding to the node.

In some embodiments, the initial vector of each element in the sequence is a row or column of the feature matrix, and the arrangement order of the rows or columns in the feature matrix is consistent with the arrangement order of the elements corresponding to the rows or columns in the sequence.

In some embodiments, the sequence is input into an encoder to obtain the initial vectors of the various elements in the sequence output by the encoder. For example, the encoder may be a word embedded model encoder, such as a Word2vec encoder, a sequence to sequence (Seq2Seq) model encoder, RNN (Recurrent Neural Network), LSTM (Long Short-Term Memory), BERT (Bidirectional Encoder Representations From Transformers), etc. The encoder generates a vector representation for each element in the sequence. Some encoders can also consider the context of each element in the sequence in the process of generating a coding result, so as to describe the sequence more accurately.

In step S106, the initial feature matrix of the node of the graph is input into a graph sequence network to enable the graph sequence network to update the feature matrix of the node using the feature matrix(es) of adjacent node(s) of the node.

Ordinary GNN does not support the processing of sequences. In the present disclosure, nodes are represented using feature matrixes, and a neural network that supports matrix calculation and also calculates based on a graph is referred to as "Graph Sequence Network". Thus, the sequence characteristics of the processed object can always be maintained in the process of graph-based processing.

In some embodiments, for each node in the graph, a feature matrix of the node output by each layer of the graph sequence network is determined according to a feature matrix of the node output by a previous layer and the feature matrix(es) of adjacent node(s) of the node output by the previous layer.

Similar to GNN, the main processing processes of a graph sequence network comprise steps of aggregation and combination. The accumulation step collects information from adjacent nodes of a current node, and the combination step fuses the collected information with information used to represent the current node. The outputs of each layer of the graph sequence network are updated features of the various nodes in the graph, and are the result of accumulating and combining the outputs of a previous layer. Thus, the graph sequence network can mine correlations between related nodes in the calculation process while preserving the sequence characteristics of a node.

In step S108, a feature matrix output by the graph sequence network for each node is obtained to perform a sequence-based classification prediction using output feature matrixes, wherein the feature matrix output for each node comprises updated vectors corresponding to the various elements in the sequence corresponding to the node. Thus, the feature matrix of each output node can retain the sequence characteristics.

With the method of the above embodiment, when performing graph-based processing on the sequence data, correlations between different sequences can be mined while preserving sequence characteristics of the data. Therefore, the amount of information lost in the construction of a graph-based neural network when processing sequence data can be reduced, and the accuracy of classification prediction based on the processed data can be improved.

An embodiment of a calculation method used in the graph sequence network will be described with reference to FIG. 2.

Figure 2:
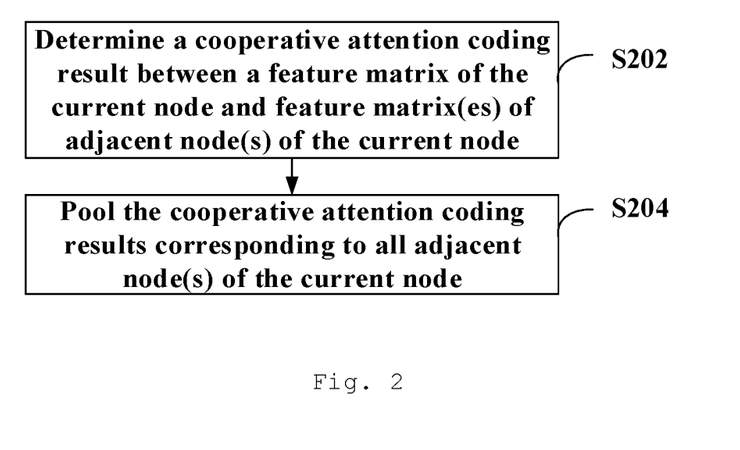
FIG. 2 shows a flowchart of a calculation method of the graph sequence network according to some embodiments of the present disclosure.

FIG. 2 shows a flowchart of a calculation method used in the graph sequence network according to some embodiments of the present disclosure. As shown in FIG. 2, the calculation method used in the graph sequence network of this embodiment comprises steps S202 to S204. In this embodiment, the processing of steps S202 to S204 is performed for each node of the graph. For ease of description, the node being processed of the graph is referred to as the "current node".

In step S202, for Kth layer of the graph sequence network, a cooperative attention coding result between a feature matrix of the current node and feature matrix(es) of adjacent node(s) of the current node is determined, wherein K is a positive integer.

In some embodiments, for each node of the graph, according to a feature matrix of the current node and feature matrix(es) of adjacent node(s) of the current node output by Kth layer of the graph sequence network, calculating correlations between elements in a sequence corresponding to the current node and elements in a sequence corresponding to the adjacent node(s) to obtain a correlation matrix; obtaining a first matrix and a second matrix by transforming the feature matrix of the current node and the feature matrix(es) of the adjacent node(s) of the node output by the Kth layer using the correlation matrix respectively; and calculating correlations among the feature matrix of the current node output by the Kth layer, the first matrix and the second matrix as the cooperative attention coding result between the feature matrix of the current node and the feature matrix(es) of the adjacent node(s).

A specific calculation method of cooperative attention coding will be described below with reference to formulas (1) to (5). In formulas (1) to (5), $C \in \mathbb{R}^{T \times D}$ represents the T×D feature matrix of the current node output by a layer, $S \in \mathbb{R}^{R \times D}$ represents the R×D feature matrix of the adjacent node of the current node output by the layer, and $O \in \mathbb{R}^{T \times D}$ represents the output result of the current node output by a next layer. The combination of a letter and a colon after the letter represents a row corresponding to the letter, for example, "i:" represents the ith row in a matrix; the combination of a letter and a colon before the letter represents a column corresponding to the letter, for example, ":j" represents the jth column in a matrix; "[;]" represents the concatenation operation of vectors. $\max_{row}$ represents taking the maximum value in each row of a matrix. $Proj_i$ and $Proj_o$ represent two multilayer perceptrons, respectively. "⊙" represents element-wise multiplication of elements at the corresponding positions in the two vectors to generate a new vector.

$$M_{i,j} = Proj_i([S_{i:}; C_{j:}; S_{i:} \odot C_{j:}]), M \in \mathbb{R}^{L \times T} \quad (1)$$

Formula (1) shows that element-wise multiplication is performed for every two elements in the sequences of two nodes to obtain correlations between the elements in the sequence corresponding to the current node and the elements in the sequence corresponding to the adjacent node.

$$\tilde{S}_{j:} = \Sigma_k a_{jk} S_{k:}, \text{ wherein } a_j = \text{softmax}(M_{:j}), \tilde{S} \in \mathbb{R}^{T \times D} \quad (2)$$

The formula (2) shows determining transformation coefficients of the feature matrix corresponding to the adjacent node of the current node based on the matrix generated by the formula (1), and transforming the feature matrix of the adjacent node to obtain a second matrix.

$$\tilde{C}_{j:} = \Sigma_k b_k C_{k:}, \text{ wherein } b = \text{softmax}(\max_{row}(M)), \tilde{C} \in \mathbb{R}^{T \times D} \quad (3)$$

The formula (3) shows determining transformation coefficients of the feature matrix corresponding to the current node based on the matrix generated by the formula (1), and transforming the feature matrix of the current node to obtain a first matrix.

$$\tilde{O}_{j:} = [C_{j:}; \tilde{S}_{j:}; C_{j:} \odot \tilde{S}_{j:}; C_{j:} \odot \tilde{C}_{j:}], \text{ wherein } \tilde{O} \in \mathbb{R}^{T \times 4D} \quad (4)$$

Formula (4) shows calculating correlations between the feature matrix of the current node and the above matrixes generated by transformation. Then, the matrix generated by formula (4) is input into a multilayer perceptron to reduce the dimensions of the matrix generated by formula (4) to obtain an updated feature matrix corresponding to the sequence of the current node.

$$O = Proj_o(\tilde{O}), \text{ wherein } O \in \mathbb{R}^{T \times D} \quad (5)$$

In step S204, the cooperative attention coding results corresponding to all adjacent node(s) of the current node are pooled to obtain a feature matrix of the current node output by (K+1)th layer of the graph sequence network.

In some embodiments, the feature matrix of the current node n output by the (K+1)th layer of the graph sequence network is represented by formula (6).

$$V_n^{k+1} = f_{com}(f_{coattn}(V_n^k, V_m^k)) \quad (6)$$

In formula (6), $V_n^k$ and $V_m^k$ are feature matrixes of a current node n and an adjacent node m of the current node n output by the (K+1)th layer, respectively. $f_{coattn}$ represents performing cooperative attention coding on the feature matrix of the current node n and the feature matrix of the adjacent node m. For the particular coding method, reference can be made to step S202. $f_{com}$ represents pooling the cooperative attention coding results corresponding to all adjacent node(s) of the current node n, such as maximum pooling or average pooling.

With the method of the above embodiment, in the case where each node in a graph is represented by a feature matrix, information exchange between the nodes of the graph can also be realized through the cooperative attention coding mechanism, and the sequence characteristics can still be retained in the processing result of each layer. Therefore, the amount of information lost in the construction of a graph-based neural network when processing sequence data can be reduced, and the accuracy of prediction based on the processed data can be improved.

Upon acquisition of the outputs of the graph sequence network, the output feature matrixes, which have sequence characteristics and can reflect correlations between different sequences, can be used for prediction. An embodiment of a prediction method of the present disclosure will be described below with reference to FIG. 3.

Figure 3:
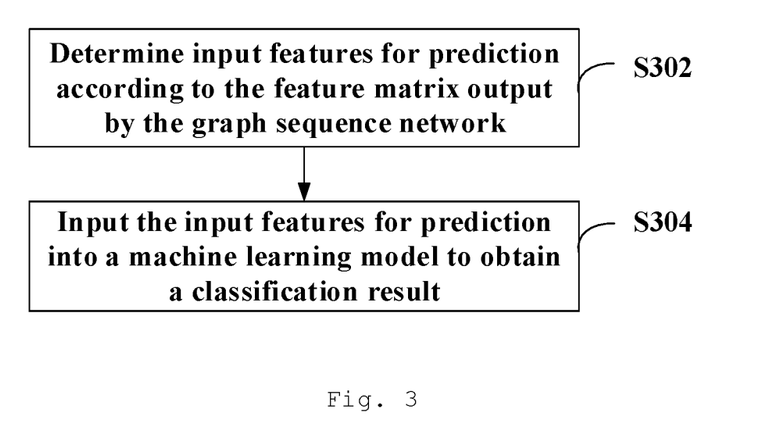
FIG. 3 shows a flowchart of a prediction method according to some embodiments of the present disclosure.

FIG. 3 shows a flowchart of a prediction method according to some embodiments of the present disclosure. As shown in FIG. 3, the prediction method of this embodiment comprises steps S302 to S304.

In step S302, input features for prediction are determined according to the feature matrix of one or more nodes of the graph output by the graph sequence network.

In step S304, the input features for prediction are input into a machine learning model to obtain a classification result predicted by the machine learning model.

In some embodiments, the input features for prediction are input into the machine learning model to obtain a classification result of a sequence involved in one or more nodes, or a classification result of an object composed of the sequence involved in one or more nodes.

In the above classification scenario, the input features are determined according to the feature matrix with sequence characteristics, which can more realistically reflect the characteristics of the object to be predicted and improve the accuracy of classification prediction.

An embodiment of the present disclosure may further provide a sequence tagging method based on classification. Sequence tagging comprises word segmentation, part of speech tagging, named entity recognition, keyword tagging and so on. An embodiment of a sequence tagging method of the present disclosure will be described below with reference to FIG. 4.

Figure 4:
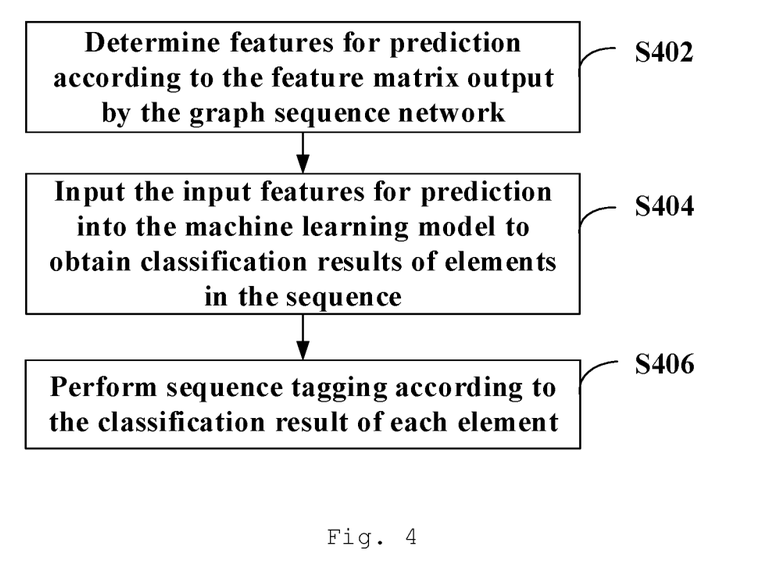
FIG. 4 shows a flowchart of a sequence tagging method according to some embodiments of the present disclosure.

FIG. 4 shows a flowchart of a sequence tagging method according to some embodiments of the present disclosure. As shown in FIG. 4, the sequence tagging method of this embodiment comprises steps S402 to S406.

In step S402, features for prediction are determined according to the feature matrix of one or more nodes of the graph output by the graph sequence network.

In sequence tagging tasks, the features used for prediction need to preserve sequence characteristics. That is, the features used for prediction comprise multiple units, for example, multiple vectors or values, and each unit is determined according to the vector of each element of the sequence in the corresponding feature matrix output by the graph sequence network.

In step S404, the input features for prediction are input into the machine learning model to obtain classification results of elements in the sequence involved in one or more nodes. The machine learning model used for sequence tagging can be LSTM, HMM (Hidden Markov Model) and so on.

In step S406, sequence tagging is performed according to the classification result of each element.

The output features of the ordinary GNN do not comprise sequence characteristics, so that sequence tagging tasks cannot be realized. Since the output of the graph sequence network of the present disclosure still retains sequence characteristics, sequence tagging can be carried out, and thereby the application scenarios of the graph-based neural networks can be expanded.

In some embodiments, the graph sequence network and the model for classification prediction are trained together. For example, training data comprising a plurality of sequences and labeled with categories in advance can be acquired; for the training data, a graph comprising a plurality of nodes is constructed, in which each node corresponds to a sequence in the training data; for each node, an initial feature matrix is determined for the node, wherein the initial feature matrix of the node comprises initial vectors of various elements in the sequence corresponding to the node; for each node, the initial feature matrix of the node of the graph is input into a graph sequence network to enable the graph sequence network to update the feature matrix of the node using the feature matrix(es) of adjacent node(s) of the node; a feature matrix output by the graph sequence network is obtained for each node to perform a sequence-based classification prediction using the output feature matrixes; the parameters of the graph sequence network and machine learning model are adjusted according to the classification prediction results and the categories labels of the training data. For example, the parameters of the multilayer perceptrons of the graph sequence network can be adjusted.

In some embodiments, the means for determining the feature matrix of each sequence (for example, the device for implementing the embodiments of FIG. 1 and FIG. 2), the means for performing the prediction method (for example, the device for implementing the embodiments of FIG. 3 to FIG. 5), and the means for performing the model training method may be independent of each other, or may be provided on the same device.

With the aforementioned embodiments of the present disclosure, text processing can be implemented. An embodiment of a text processing method of the present disclosure will be described below with reference to FIG. 5.

Figure 5:
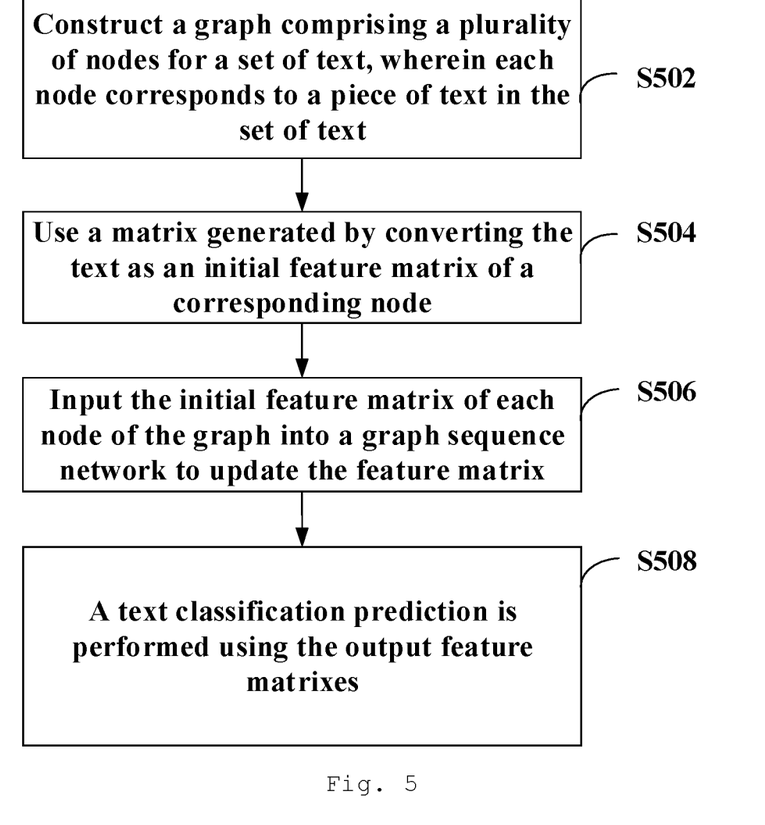
FIG. 5 shows a flowchart of a text processing method according to some embodiments of the present disclosure.

FIG. 5 shows a flowchart of a text processing method according to some embodiments of the present disclosure. As shown in FIG. 5, the text processing method of this embodiment comprises steps S502 to S508.

In step S502, a graph comprising a plurality of nodes is constructed for a set of text, wherein each node corresponds to a piece of text in the set of text.

In step S504, for each piece of text, a matrix generated by converting the text is used as an initial feature matrix of a corresponding node, wherein the feature matrix comprises initial vectors of various elements in the text corresponding to the node.

In some embodiments, the elements are tokens in the text, wherein the tokens include at least one of words, roots, or affixes.

In step S506, for each node, the initial feature matrix of the node of the graph is input into a graph sequence network to obtain a feature matrix output by the graph sequence network for each node as an updated feature matrix of the text corresponding to the node, wherein the feature matrix of each node is updated using the graph sequence network, and the feature matrix output for each node comprises updated vectors corresponding to various elements in the text corresponding to the node. For the specific method of updating the feature matrix using the graph sequence network, reference may be made to the method of the embodiments of FIG. 1 to FIG. 2, which will not be repeated herein.

In step S508, a text classification prediction is performed using the output feature matrixes.

In the above embodiment, when the feature matrix of the text is determined according to correlations between the set of text, the sequence characteristics of the elements in the text are preserved, so that the output feature matrix can more accurately reflect the characteristics of the text, and the accuracy of subsequent prediction using the feature matrix can be improved.

An embodiment of a text prediction method of the present disclosure will be described below with reference to FIG. 6.

Figure 6:
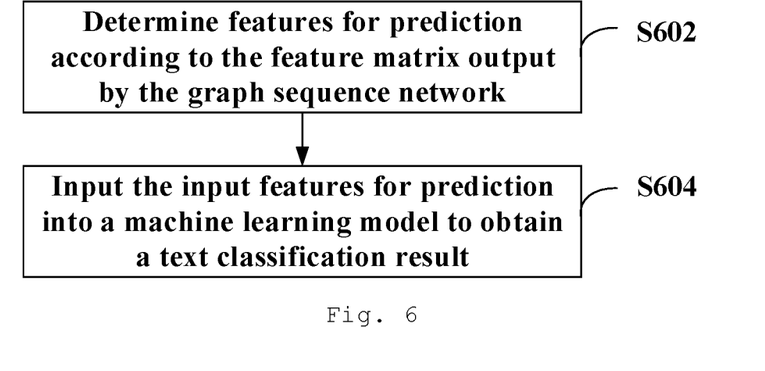
FIG. 6 shows a flowchart of prediction of text classification according to some embodiments of the present disclosure.

FIG. 6 shows a flowchart of text classification prediction according to some embodiments of the present disclosure. As shown in FIG. 6, the text prediction method of this embodiment comprises steps S602 to S604.

In step S602, features for prediction are determined according to the feature matrix of one or more nodes of the graph output by the graph sequence network.

In step S604, the input features for prediction are input into a machine learning model to obtain a text classification result predicted by the machine learning model.

In some embodiments, the input features for prediction are input into the machine learning model to obtain a classification result of each element in the text involved in one or more nodes, so as to perform sequence tagging of the text according to the classification result of each element.

In some embodiments, an automatic question answering system is implemented with the aid of the sequence tagging function. For example, question text, text in question support documents can be used as nodes of the graph. After updating the feature matrix of each piece of text through the graph sequence network, input features for prediction are generated based on the question text and the text in question support documents, and are input into the machine learning model for sequence tagging. The machine learning model determines the probability that each element in the text is the start point or the end point of an answer, and outputs a decision based on the probability. Thus, based on the start and end elements, an answer can be obtained from the question support documents.

In some embodiments, the input features for prediction are input into the machine learning model to obtain a classification result of the text involved in one or more nodes, or a classification result of an object composed of the text involved in one or more nodes.

For example, "graph classification" can be done based on the output of the graph sequence network, that is, classification is performed on the sequences involved in all nodes of the graph as a whole. If the plurality of nodes of the graph correspond to multiple sentences in an article, for example, the outputs corresponding to all nodes of the graph are fused into features for prediction, and the fused features are input into a classifier to obtain a classification result of the article. Of course, if the plurality of nodes of the graph correspond to multiple articles, the outputs corresponding to nodes involved in a certain article can be fused into features for prediction to predict a classification result of this article.

For another example, a feature matrix corresponding to a node of the graph can be obtained, and the feature matrix can be transformed to obtain output features for prediction, so as to realize the classification of a sequence corresponding to the node, for example, to classify a sentence. In the automatic question answering scenario, the question text, the text in the question support documents, and the alternative answer text can all be used as nodes of the graph. After updating the feature matrix of each piece of text through the graph sequence network, the feature matrix of the alternative answer text and the feature matrix of the question text can be fused and transformed to obtain a classification result output by the machine learning model, wherein the classification result indicates whether an alternative answer is the correct answer to the question.

An embodiment of a sequenced data processing apparatus of the present disclosure will be described below with reference to FIG. 7.

Figure 7:
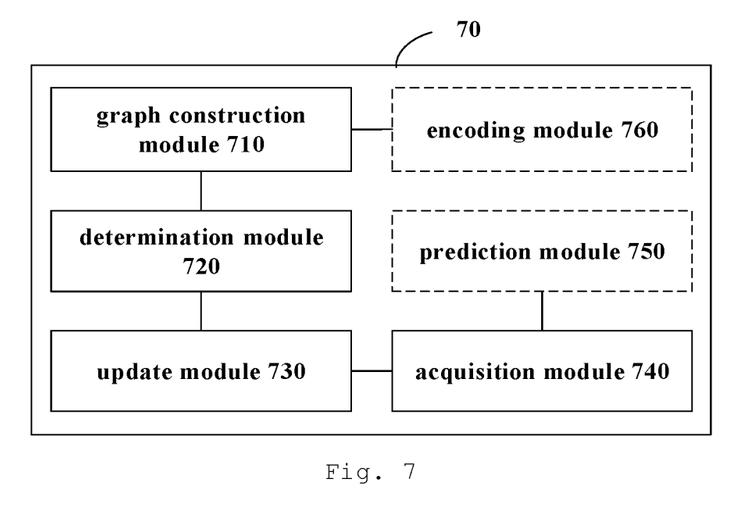
FIG. 7 shows a structural diagram of a sequenced data processing apparatus according to some embodiments of the present disclosure.

FIG. 7 shows a structural diagram of a sequenced data processing apparatus according to some embodiments of the present disclosure. As shown in FIG. 7, this sequenced data processing apparatus 70 comprises: a graph construction module 710 configured to construct a graph comprising a plurality of nodes for a set of sequences, wherein each node corresponds to a sequence in the set of sequences; a determination module 720 configured to for each node, determine an initial feature matrix of the node, wherein the initial feature matrix of the node comprises initial vectors of various elements in a sequence corresponding to the node; an update module 730 configured to for each node, input the initial feature matrix of the node of the graph into a graph sequence network to enable the graph sequence network to update the feature matrix of the node using the feature matrix(es) of adjacent node(s) of the node; an obtaining module 740 configured to obtain a feature matrix output by the graph sequence network of each node to perform a sequence-based classification prediction using output feature matrixes, wherein the feature matrix output for each node comprises updated vectors corresponding to the various elements in the sequence corresponding to the node.

In some embodiments, for each node in the graph, a feature matrix of the node output by each layer of the graph sequence network is determined according to a feature matrix of the node output by a previous layer and the feature matrix(es) of adjacent node(s) of the node output by the previous layer.

In some embodiments, the update module 730 is further configured to, for Kth layer of the graph sequence network, determine a cooperative attention coding result between a feature matrix of the node of the graph and feature matrix(es) of adjacent node(s) of the node, wherein K is a positive integer; and pooling the cooperative attention coding results corresponding to all adjacent node(s) of the node to obtain a feature matrix of the node output by (K+1)th layer of the graph sequence network.

In some embodiments, the update module 730 is further configured to, for layer K of the graph sequence network, for each node of the graph, according to a feature matrix of the node and feature matrix(es) of adjacent node(s) of the node output by Kth layer of the graph sequence network, calculate correlations between elements in a sequence corresponding to the node and elements in a sequence corresponding to the adjacent node(s) to obtain a correlation matrix; obtain a first matrix and a second matrix by transforming the feature matrix of the node and the feature matrix(es) of the adjacent node(s) of the node output by the Kth layer using the correlation matrix respectively; and calculate correlations among the feature matrix of the node output by the Kth layer, the first matrix and the second matrix as the cooperative attention coding result between the feature matrix of the node and the feature matrix(es) of the adjacent node(s).

In some embodiments, the sequenced data processing apparatus 70 further comprises: a prediction module 750 configured to determine input features for prediction according to the feature matrixes of one or more nodes of the graph output by the graph sequence network; and input the input features for prediction into a machine learning model to obtain a classification result.

In some embodiments, the prediction module 750 is configured to input the input features for prediction into the machine learning model to obtain a classification result of each element in a sequence involved in one or more nodes to perform sequence tagging according to the classification result of each element.

In some embodiments, the prediction module 750 is configured to input the input features for prediction into the machine learning model to obtain a classification result of a sequence involved in one or more nodes, or a classification result of an object composed of the sequence involved in one or more nodes.

In some embodiments, the prediction module 750 may belong to a different device from other modules in the apparatus.

In some embodiments, the sequenced data processing apparatus 70 further comprises: an encoding module 760 configured to input the sequence into an encoder to obtain initial vectors of various elements in the sequence output by the encoder.

In some embodiments, the encoding module 760 may belong to a different device from other modules in the apparatus.

In some embodiments, the sequence is text.

In some embodiments, the elements in the sequence are tokens in the text, wherein the tokens comprise at least one of words, roots, or affixes.

In some embodiments, the sequence comprises one or more of sentences, phrases, named entities, or noun phrases; and a plurality of nodes that meet at least one of the following conditions are adjacent nodes: a plurality of nodes corresponding to multiple sentences from a same document, a plurality of nodes corresponding to multiple sentences with a same named entity or noun phrase, and a plurality of nodes corresponding to multiple sentences with named entities or noun phrases appearing in preacquired question text.

An embodiment of a text processing apparatus of the present disclosure will be described below with reference to FIG. 8.

Figure 8:
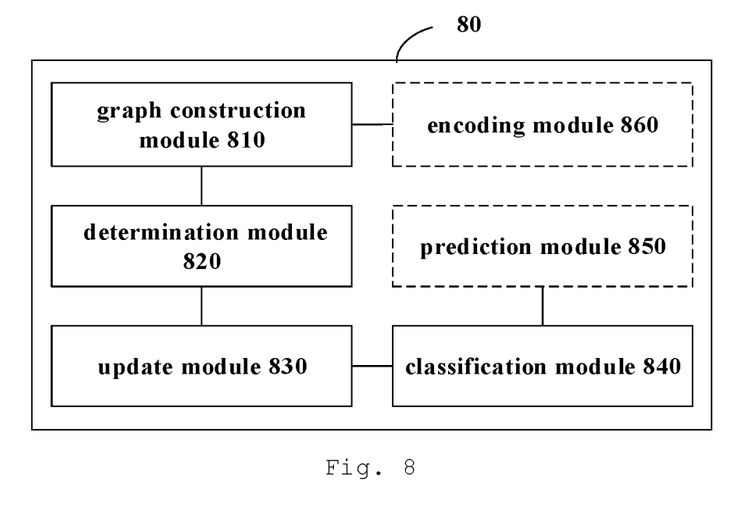
FIG. 8 shows a structural diagram of a text processing apparatus according to some embodiments of the present disclosure.

FIG. 8 shows a structural diagram of a text processing apparatus according to some embodiments of the present disclosure. As shown in FIG. 8, this sequenced data processing apparatus 80 comprises: a graph construction module 810 configured to construct a graph comprising a plurality of nodes for a set of text, wherein each node corresponds to a piece of text in the set of text; a determination module 820 configured to for each piece of text, use a matrix generated by converting the text as an initial feature matrix of a corresponding node, wherein the feature matrix comprising initial vectors of various elements in the text corresponding to the node, and the elements are tokens in the text, comprising at least one of words, roots, or affixes; an update module 830 configured to for each node, input the initial feature matrix of the node of the graph into a graph sequence network to obtain a feature matrix output by the graph sequence network for each node as an updated feature matrix of the text corresponding to the node, wherein the feature matrix of each node is updated using the graph sequence network, and the feature matrix output for each node comprises updated vectors corresponding to various elements in the text corresponding to the node; a classification module 840 configured to performing a text classification prediction using the output feature matrixes.

In some embodiments, for each node in the graph, a feature matrix of the node output by each layer of the graph sequence network is determined according to a feature matrix of the node output by a previous layer and the feature matrix(es) of adjacent node(s) of the node output by the previous layer.

In some embodiments, the update module 830 is further configured to, for Kth layer of the graph sequence network, determine a cooperative attention coding result between a feature matrix of the node of the graph and feature matrix(es) of adjacent node(s) of the node, wherein K is a positive integer; and pool the cooperative attention coding results corresponding to all adjacent node(s) of the node to obtain a feature matrix of the node output by (K+1)th layer of the graph sequence network.

In some embodiments, the update module 830 is further configured to, for layer K of the graph sequence network, determine a cooperative attention coding result between a feature matrix of a node and feature matrix(es) of adjacent node(s) of the node in the following manner: for each node of the graph, according to a feature matrix of the node and feature matrix(es) of adjacent node(s) of the node output by Kth layer of the graph sequence network, calculating correlations between elements in a sequence corresponding to the node and elements in a sequence corresponding to the adjacent node(s) to obtain a correlation matrix; obtaining a first matrix and a second matrix by transforming the feature matrix of the node and the feature matrix(es) of the adjacent node(s) of the node output by the Kth layer using the correlation matrix respectively; and calculating correlations among the feature matrix of the node output by the Kth layer, the first matrix and the second matrix as the cooperative attention coding result between the feature matrix of the node and the feature matrix(es) of the adjacent node(s).

In some embodiments, the text processing apparatus 80 further comprises: a prediction module 850 configured to determining input features for prediction according to the feature matrixes of one or more nodes of the graph output by the graph sequence network; and inputting the input features for prediction into a machine learning model to obtain a classification result of the text.

In some embodiments, the prediction module 850 is configured to input the input features for prediction into the machine learning model to obtain a classification result of each element in the text involved in one or more nodes to perform sequence tagging for the text according to the classification result of each element.

In some embodiments, the prediction module 850 is configured to input the input features for prediction into the machine learning model to obtain a classification result of the text involved in one or more nodes, or a classification result of an object composed of the text involved in one or more nodes.

In some embodiments, the text processing apparatus 80 further comprises: an encoding module 860 configured to input the text into an encoder to obtain initial vectors of various elements in the text output by the encoder.

In some embodiments, the elements in the text are tokens in the text, wherein the tokens comprise at least one of words, roots, or affixes.

In some embodiments, the text comprises one or more of sentences, phrases, named entities, or noun phrases; and a plurality of nodes that meet at least one of the following conditions are adjacent nodes: a plurality of nodes corresponding to multiple sentences from a same document, a plurality of nodes corresponding to multiple sentences with a same named entity or noun phrase, and a plurality of nodes corresponding to multiple sentences with named entities or noun phrases appearing in preacquired question text.

Figure 9:
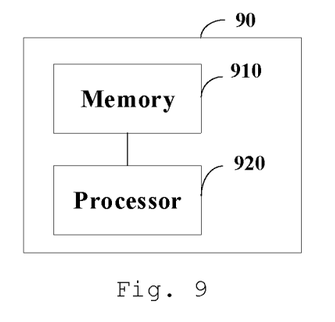
FIG. 9 shows a structural diagram of a data processing apparatus according to some embodiments of the present disclosure.

FIG. 9 shows a structural diagram of a data processing apparatus according to some embodiments of the present disclosure, wherein the data processing apparatus may be a sequenced data processing apparatus or a text processing apparatus. As shown in FIG. 9, the data processing apparatus 90 of this embodiment includes a memory 910 and a processor 920 coupled to the memory 910, the processor 920 configured to, based on instructions stored in the memory 910, carry out the data processing method according to any one of the foregoing embodiments.

Wherein, the memory 910 may include, for example, system memory, a fixed non-volatile storage medium, or the like. The system memory stores, for example, an operating system, application programs, a boot loader (Boot Loader), and other programs.

Figure 10:
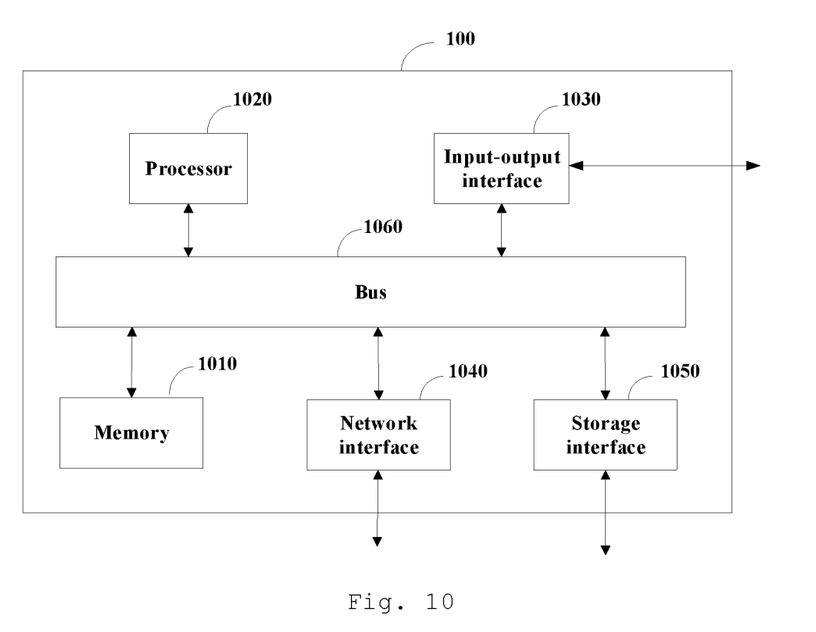
FIG. 10 shows a structural diagram of a data processing apparatus according to other embodiments of the present disclosure.

FIG. 10 shows a structural diagram of a data processing apparatus according to other embodiments of the present disclosure, wherein the data processing apparatus may be a sequenced data processing apparatus or a text processing apparatus. As shown in FIG. 10, the data processing apparatus 100 of this embodiment includes a memory 1010 and a processor 1020, and may further include an input-output interface 1030, a network interface 1040, a storage interface 1050, and the like. These interfaces 1030, 1040, 1050 and the memory 1010 and the processor 1020 may be connected through a bus 1060, for example. The input-output interface 1030 provides a connection interface for input-output devices such as a display, a mouse, a keyboard, and a touch screen. The network interface 1040 provides a connection interface for various networked devices. The storage interface 1050 provides a connection interface for external storage devices such as an SD card and a USB flash disk.

An embodiment of the present disclosure further provides a non-transitory computer-readable storage medium on which a computer program is stored, characterized in that the program when executed by a processor implements any one of the foregoing data processing methods.

Those skilled in the art should understand that the embodiments of the present disclosure may be provided as a method, a system, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more computer-usable non-transitory storage media (including but not limited to disk storage, CD-ROM, optical memory, etc.) having computer-usable program code embodied therein.

The present disclosure is described with reference to flowcharts and/or block diagrams of methods, apparatuses (systems) and computer program products according to embodiments of the present disclosure. It should be understood that each process and/or block in the flowcharts and/or block diagrams, and combinations of the processes and/or blocks in the flowcharts and/or block diagrams may be implemented by computer program instructions. The computer program instructions may be provided to a processor of a general purpose computer, a special purpose computer, an embedded processor, or other programmable data processing apparatus to generate a machine such that the instructions executed by a processor of a computer or other programmable data processing apparatus to generate means implementing the functions specified in one or more flows of the flowcharts and/or one or more blocks of the block diagrams.

The computer program instructions may also be stored in a computer readable memory device capable of directing a computer or other programmable data processing apparatus to operate in a specific manner such that the instructions stored in the computer readable memory device produce an article of manufacture including instruction means implementing the functions specified in one or more flows of the flowcharts and/or one or more blocks of the block diagrams.

These computer program instructions can also be loaded onto a computer or other programmable device to perform a series of operation steps on the computer or other programmable device to generate a computer-implemented process such that the instructions executed on the computer or other programmable device provide steps implementing the functions specified in one or more flows of the flowcharts and/or one or more blocks of the block diagrams.

The above is merely preferred embodiments of this disclosure, and is not limitation to this disclosure. Within spirit and principles of this disclosure, any modification, replacement, improvement and etc. shall be contained in the protection scope of this disclosure.

What is claimed is:

1. A sequenced data processing method, comprising:
constructing a graph comprising a plurality of nodes for a set of sequences, wherein each node corresponds to a sequence in the set of sequences, the sequences comprise a text from a question text, text(s) in question support documents and alternative answer text(s);
for each node:
determining an initial feature matrix of the node, wherein the initial feature matrix of the node comprises initial vectors of various elements in a sequence corresponding to the node, wherein an initial vector of the each element in the sequence is a row or column of the feature matrix, and an arrangement order of rows or columns in the feature matrix is consistent with the arrangement order of the elements corresponding to the rows or the columns in the sequence; and
inputting the initial feature matrix of the node of the graph into a graph sequence network to enable the graph sequence network to update the feature matrix of the node using the feature matrix(es) of adjacent node(s) of the node;
obtaining a feature matrix output by the graph sequence network of each node, wherein the feature matrix output for each node comprises updated vectors corresponding to the various elements in the sequence corresponding to the node;
fusing and transforming updated feature matrix(es) of the alternative answer text(s) and an updated feature matrix of the question text to obtain a classification result output by a machine learning model; and
determining whether an alternative answer is a correct answer according to the classification result to realize automatic question answering.

2. The sequenced data processing method according to claim 1, wherein for each node in the graph, a feature matrix of the node output by each layer of the graph sequence network is determined according to a feature matrix of the node output by a previous layer and the feature matrix(es) of adjacent node(s) of the node output by the previous layer.

3. The sequenced data processing method according to claim 2, wherein the updating the feature matrix of the node comprises:
for Kth layer of the graph sequence network, determining a cooperative attention coding result between a feature matrix of the node of the graph and feature matrix(es) of adjacent node(s) of the node, wherein K is a positive integer; and
pooling the cooperative attention coding results corresponding to all adjacent node(s) of the node to obtain a feature matrix of the node output by (K+1)th layer of the graph sequence network.

4. The sequenced data processing method according to claim 3, wherein for Kth layer of the graph sequence network, the determining a cooperative attention coding result between a feature matrix of the node of the graph and feature matrix(es) of adjacent node(s) of the node comprises:
for each node of the graph, according to a feature matrix of the node and feature matrix(es) of adjacent node(s) of the node output by Kth layer of the graph sequence network, calculating correlations between elements in a sequence corresponding to the node and elements in a sequence corresponding to the adjacent node(s) to obtain a correlation matrix;
obtaining a first matrix and a second matrix by transforming the feature matrix of the node and the feature matrix(es) of the adjacent node(s) of the node output by the Kth layer using the correlation matrix respectively; and
calculating correlations among the feature matrix of the node output by the Kth layer, the first matrix and the second matrix as the cooperative attention coding result between the feature matrix of the node and the feature matrix(es) of the adjacent node(s).

5. The sequenced data processing method according to claim 1, further comprising:
determining input features for prediction according to the feature matrixes of one or more nodes of the graph output by the graph sequence network; and
inputting the input features for prediction into a machine learning model to obtain a classification result.

6. The sequenced data processing method according to claim 5, wherein the inputting the input features for prediction into a machine learning model to obtain a classification result comprises:
inputting the input features for prediction into the machine learning model to obtain a classification result of each element in a sequence involved in one or more nodes to perform sequence tagging according to the classification result of each element.

7. The sequenced data processing method according to claim 5, wherein the inputting the input features for prediction into a machine learning model to obtain a classification result comprises:
inputting the input features for prediction into the machine learning model to obtain a classification result of a sequence involved in one or more nodes, or a classification result of an object composed of the sequence involved in one or more nodes.

8. The sequenced data processing method according to claim 1, further comprising:
inputting the sequence into an encoder to obtain initial vectors of various elements in the sequence output by the encoder.

9. The sequenced data processing method according to claim 1, wherein the sequence is text.

10. The sequenced data processing method according to claim 9, wherein the elements in the sequence are tokens in the text, wherein the tokens comprise at least one of words, roots, or affixes.

11. The sequenced data processing method according to claim 9, wherein:
the sequence comprises one or more of sentences, phrases, named entities, or noun phrases; and
a plurality of nodes that meet at least one of the following conditions are adjacent nodes: a plurality of nodes corresponding to multiple sentences from a same document, a plurality of nodes corresponding to multiple sentences with a same named entity or noun phrase, and a plurality of nodes corresponding to multiple sentences with named entities or noun phrases appearing in preacquired question text.

12. A sequenced data processing apparatus, comprising:
a memory; and
a processor coupled to the memory, storing program instructions which, when executed by the processor, cause the processor to:
construct a graph comprising a plurality of nodes for a set of sequences, wherein each node corresponds to a sequence in the set of sequences, the sequences comprise a text from a question text, text(s) in question support documents and alternative answer text(s);
for each node:
determining an initial feature matrix of the node, wherein the initial feature matrix of the node comprises initial vectors of various elements in a sequence corresponding to the node, wherein an initial vector of the each element in the sequence is a row or column of the feature matrix, and an arrangement order of rows or columns in the feature matrix is consistent with the arrangement order of the elements corresponding to the rows or the columns in the sequence; and
inputting the initial feature matrix of the node of the graph into a graph sequence network to enable the graph sequence network to update the feature matrix of the node using the feature matrix(es) of adjacent node(s) of the node;
obtaining a feature matrix output by the graph sequence network of each node to perform a sequence-based classification prediction using output feature matrixes, wherein the feature matrix output for each node comprises updated vectors corresponding to the various elements in the sequence corresponding to the node;
fusing and transforming updated feature matrix(es) of the alternative answer text(s) and an updated feature matrix of the question text to obtain a classification result output by a machine learning model; and
determining whether an alternative answer is a correct answer according to the classification result to realize automatic question answering.

13. A non-transitory computer-readable storage medium on which a computer program is stored, which when executed by a processor implements the sequenced data processing method according to claim 1.

14. The sequenced data processing apparatus according to claim 12, wherein for each node in the graph, a feature matrix of the node output by each layer of the graph sequence network is determined according to a feature matrix of the node output by a previous layer and the feature matrix(es) of adjacent node(s) of the node output by the previous layer.

15. The sequenced data processing apparatus according to claim 14, wherein updating the feature matrix of each node using the graph sequence network comprises:

for Kth layer of the graph sequence network, determining a cooperative attention coding result between a feature matrix of each node of the graph and feature matrix(es) of adjacent node(s) of the node, wherein K is a positive integer; and pooling the cooperative attention coding results corresponding to all adjacent node(s) of each node of the graph to obtain a feature matrix of each node output by (K+1)th layer of the graph sequence network.

16. The sequenced data processing apparatus according to claim 15, wherein for Kth layer of the graph sequence network, the determining a cooperative attention coding result between a feature matrix of the node of the graph and feature matrix(es) of adjacent node(s) of the node comprises:

for each node of the graph, according to a feature matrix of the node and feature matrix(es) of adjacent node(s) of the node output by Kth layer of the graph sequence network, calculating correlations between elements in a sequence corresponding to the node and elements in a sequence corresponding to the adjacent node(s) to obtain a correlation matrix;

obtaining a first matrix and a second matrix by transforming the feature matrix of the node and the feature matrix(es) of the adjacent node(s) of the node output by the Kth layer using the correlation matrix respectively; and calculating correlations among the feature matrix of the node output by the Kth layer, the first matrix and the second matrix as the cooperative attention coding result between the feature matrix of the node and the feature matrix(es) of the adjacent node(s).

17. The sequenced data processing apparatus according to claim 12, wherein the instructions further cause the processor to:

determine input features for prediction according to the feature matrixes of one or more nodes of the graph output by the graph sequence network; and input the input features for prediction into a machine learning model to obtain a classification result.

18. The sequenced data processing apparatus according to claim 17, wherein the inputting the input features for prediction into a machine learning model to obtain a classification result comprises:

inputting the input features for prediction into the machine learning model to obtain a classification result of each element in a sequence involved in one or more nodes to perform sequence tagging according to the classification result of each element.

* * * * *